US009480069B2

(12) United States Patent
Sadek

(10) Patent No.: US 9,480,069 B2
(45) Date of Patent: Oct. 25, 2016

(54) RECEIVER MEASUREMENT ASSISTED ACCESS POINT CONTROL

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 13/842,657

(22) Filed: Mar. 15, 2013

(65) Prior Publication Data

US 2014/0226505 A1 Aug. 14, 2014

Related U.S. Application Data

(60) Provisional application No. 61/764,958, filed on Feb. 14, 2013.

(51) Int. Cl.
| | |
|---|---|
| *H04W 4/00* | (2009.01) |
| *H04W 72/08* | (2009.01) |
| *H04J 3/16* | (2006.01) |
| *H04W 24/10* | (2009.01) |

(Continued)

(52) U.S. Cl.
CPC .......... *H04W 72/082* (2013.01); *H04J 3/1694* (2013.01); *H04L 5/0073* (2013.01); *H04W 24/10* (2013.01); *H04L 1/0026* (2013.01); *H04W 28/18* (2013.01); *H04W 72/02* (2013.01); *H04W 84/12* (2013.01)

(58) Field of Classification Search
CPC ........... H04W 72/082; H04W 72/085; H04W 72/087; H04W 74/00; H04W 72/12; H04W 72/1278
USPC ....... 370/329, 330, 331, 332, 333, 337, 341, 370/318, 321; 455/436, 450, 452.2, 13.4, 455/115.3, 132–135, 161.1, 161.3
See application file for complete search history.

(56) References Cited

U.S. PATENT DOCUMENTS

| | | | |
|---|---|---|---|
| 6,741,554 B2 * | 5/2004 | D'Amico | H04L 1/1893 370/225 |
| 6,985,465 B2 | 1/2006 | Cervello et al. | |

(Continued)

FOREIGN PATENT DOCUMENTS

| | | |
|---|---|---|
| CN | 1399434 A | 2/2003 |
| CN | 1675865 A | 9/2005 |

(Continued)

OTHER PUBLICATIONS

International Search Report and Written Opinion—PCT/US2014/016130—ISA/EPO—May 6, 2014.

(Continued)

*Primary Examiner* — Hanh N Nguyen
(74) *Attorney, Agent, or Firm* — Arent Fox LLP

(57) ABSTRACT

Methods and apparatus are provided for receiver measurement assisted access point control. A method operable by a Wi-Fi network entity includes signaling a time to at least one station served by the Wi-Fi network entity for interference measurements. The method includes receiving interference measurements taken at the signaled time from the at least one station. The method includes tuning transmitter parameters based on the received interference measurements.

69 Claims, 9 Drawing Sheets

(51) Int. Cl.
*H04L 5/00* (2006.01)
*H04W 84/12* (2009.01)
*H04W 28/18* (2009.01)
*H04W 72/02* (2009.01)
*H04L 1/00* (2006.01)

(56) References Cited

U.S. PATENT DOCUMENTS

| | | | |
|---|---|---|---|
| 7,285,945 B2 | 10/2007 | Palinkas et al. | |
| 7,376,100 B2 * | 5/2008 | Chang | 370/329 |
| 7,385,945 B1 * | 6/2008 | Olson | H04W 72/005 370/328 |
| 8,718,561 B2 * | 5/2014 | Zou | 455/63.1 |
| 2002/0060995 A1 * | 5/2002 | Cervello | H04W 72/02 370/332 |
| 2004/0037247 A1 * | 2/2004 | Ngo | 370/332 |
| 2004/0203864 A1 | 10/2004 | DiBuduo | |
| 2005/0030897 A1 | 2/2005 | Sandhu | |
| 2007/0002806 A1 | 1/2007 | Soomro | |
| 2010/0182915 A1 | 7/2010 | Montemurro et al. | |
| 2010/0197317 A1 | 8/2010 | Sadek et al. | |
| 2012/0039197 A1 | 2/2012 | Jang et al. | |
| 2012/0120846 A1 | 5/2012 | Hwang et al. | |
| 2012/0257585 A1 * | 10/2012 | Sydor et al. | 370/329 |
| 2013/0017794 A1 * | 1/2013 | Kloper et al. | 455/63.1 |
| 2014/0016478 A1 * | 1/2014 | Koskela et al. | 370/241 |
| 2014/0226506 A1 | 8/2014 | Sadek | |

FOREIGN PATENT DOCUMENTS

| | | |
|---|---|---|
| EP | 1137203 A2 | 9/2001 |
| WO | 0022783 A1 | 4/2000 |
| WO | 0223819 A2 | 3/2002 |
| WO | 2004100450 A1 | 11/2004 |

OTHER PUBLICATIONS

Abusubaih M., et al., "Collaborative setting of RTS/CTS in multi-rate multi-BSS IEEE 802.11 wireless LANs", 2008 16th IEEE Workshop on Local and Metropolitan Area Networks, Sep. 3, 2008, XP055153629, pp. 31-36.

Taiwan Search Report—TW103104769—TIPO—Jul. 16, 2015.

Taiwan Search Report issued in Taiwanese Patent Application No. 103104769 dated May 3, 2016.

* cited by examiner

RECEIVER MEASUREMENT ASSISTED ACCESS POINT CONTROL

CROSS-REFERENCE TO RELATED APPLICATION

The present Application for Patent claims priority to Provisional Application No. 61/764,958, filed Feb. 14, 2013, entitled "RECEIVER MEASUREMENT ASSISTED ACCESS POINT CONTROL", which is assigned to the assignee hereof, and is hereby expressly incorporated in its entirety by reference herein.

This application is related to concurrently filed and commonly owned U.S. patent application Ser. No. 13/842,887, entitled "RECEIVER MEASUREMENT ASSISTED ACCESS POINT CONTROL,", the disclosure of which is hereby incorporated by reference herein.

FIELD

The present disclosure relates generally to communication systems, and more specifically to techniques for receiver assisted channel selection.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks, Carrier Sense Multiple Access (CSMA).

A wireless communication network may include a number of access point that can support communication for a number of mobile devices, such as, for example, mobile stations (STA), laptops, cell phones, PDAs, tablets, etc. A STA may communicate with an access point via the downlink (DL) and uplink (UL). The DL (or forward link) refers to the communication link from the access point to the STA, and the UL (or reverse link) refers to the communication link from the STA to the access point. With the increasing popularity of mobile devices, there is a desire to optimize bandwidth and resource selection.

SUMMARY

Methods and apparatus for receiver measurement assisted access point control are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method operable by a Wi-Fi network entity includes signaling a time to at least one station served by the Wi-Fi network entity for interference measurements. The method includes receiving interference measurements taken at the signaled time from the at least one station. The method includes tuning transmitter parameters based on the received interference measurements.

In another aspect, a Wi-Fi apparatus includes at least one processor configured to signal a time to at least one station served by the Wi-Fi apparatus for interference measurements, receive interference measurements taken at the signaled time from the at least one station, and tune transmitter parameters based on the received interference measurements. The Wi-Fi apparatus includes a memory coupled to the at least one processor for storing data.

In another aspect, a Wi-Fi apparatus includes means for signaling a time to at least one station served by the Wi-Fi network entity for interference measurements. The Wi-Fi apparatus includes means for receiving interference measurements taken at the signaled time from the at least one station. The Wi-Fi apparatus includes means for tuning transmitter parameters based on the received interference measurements.

In another aspect, a computer program product includes a computer readable medium including code for causing at least one computer to signal a time to at least one station served by the Wi-Fi network entity for interference measurements. The computer-readable medium includes code for causing the at least one computer to receive interference measurements taken at the signaled time from the at least one station. The computer-readable medium includes code for causing the at least one computer to tune transmitter parameters based on the received interference measurements.

In another aspect, a method operable by a Wi-Fi station includes receiving a time from a network entity for interference measurements. The method includes measuring interference based on the received time. The method includes sending the measured interference to the network entity.

In another aspect, a Wi-Fi apparatus includes at least one processor configure to receive a time from a network entity for interference measurements, measure interference based on the received time, and send the measured interference to the network entity. The Wi-Fi apparatus includes a memory coupled to the at least one processor for storing data.

In another aspect, a Wi-Fi apparatus includes means for receiving a time from a network entity for interference measurements. The Wi-Fi apparatus includes means for measuring interference based on the received time. The Wi-Fi apparatus includes means for sending the measured interference to the network entity.

In another aspect, a computer program product includes a computer readable medium comprising code for causing at least one computer to receive a time from a network entity for interference measurements. The computer-readable medium includes code for causing the at least one computer to measure interference based on the received time. The computer-readable medium includes code for causing the at least one computer to send the measured interference to the network entity.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
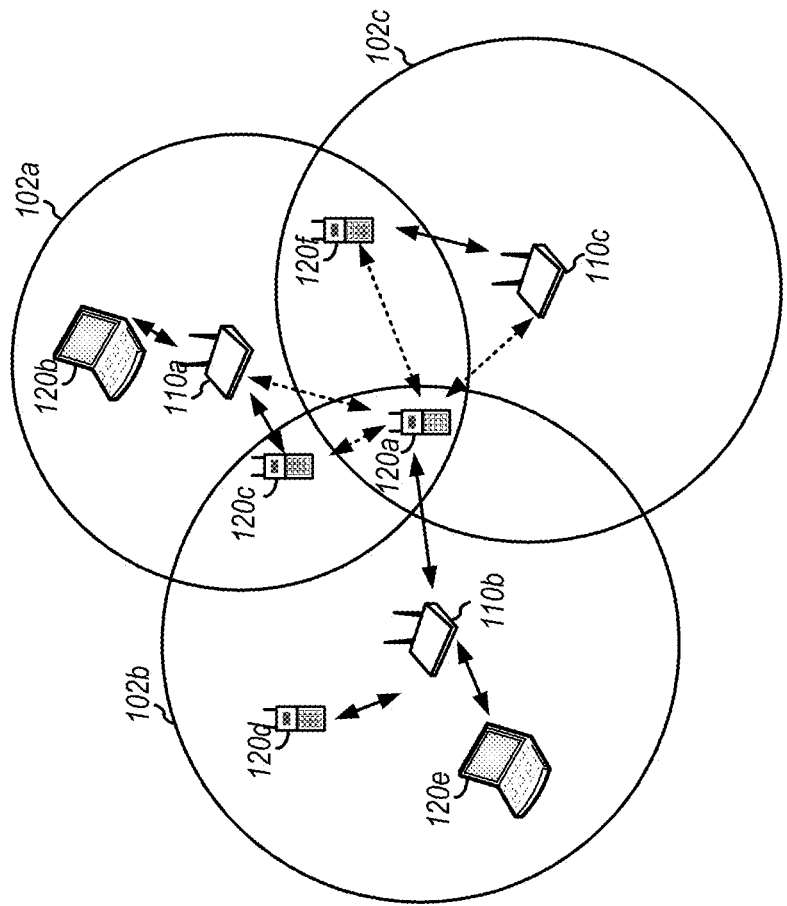
FIG. 1 is a block diagram conceptually illustrating an example of a telecommunications system.
Figure 1:
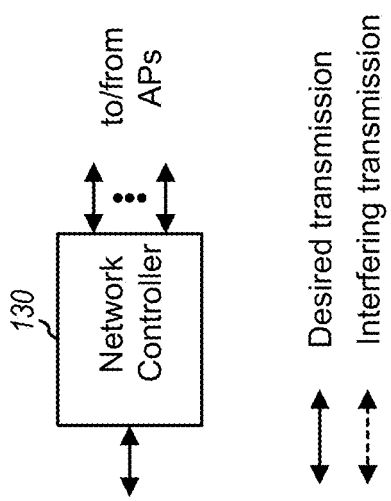

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station (STA), mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with an access point (AP). An access point may be utilized for communicating with wireless terminal(s) and may also be referred to as a base station, wireless access point, Wi-Fi access point, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, Wi-Fi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. Wi-Fi is a set of standards for implementing wireless local area network (WLAN) computer communication. Wi-Fi may include the industrial, scientific, and medical (ISM) radio bands including the 2.4, 3.6, 5, and 60 GHz frequency bands. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100, which may be a Wi-Fi network, is illustrated in accordance with various embodiments presented herein. The wireless network 100 may include a number of APs 110 and other network entities. An AP may be a station that communicates with the STA and may also be referred to as a base station, Wi-Fi AP, or other term. Each AP 110*a*, 110*b*, 110*c* may provide communication coverage for a particular geographic area, which may be called a basic service area (BSA). A basic service set (BSS) may refer to an AP together with all associated STAs in an infrastructure mode. In ad-hoc mode, it may be possible to create a network of client devices without a controlling AP. In the ad-hoc mode, a set of synchronized STAs (with one acting as a master) may form the BSS. Overlapping BSSs (OBSS) may occur when the two or more of the BSSs are in close enough proximity to hear each other. In the example of FIG. 1, BSSs associated with APs 110*a*, 110*b*, and 110*c* overlap. OBSS may degrade network performance. Each BSS may be identified by a BSS id (BSSID). The BSSID may include the MAC address of the AP.

An AP may provide communication coverage for a cell. In the example shown in FIG. 1, the APs 110a, 110b, and 110c may be Wi-Fi APs for the cells 102a, 102b, and 102c, respectively. Each AP may operate on one or more channels. The one or channels for each AP may be chosen or selected to minimize interference between cells.

A network controller 130 may couple to a set of APs and provide coordination and control for these APs. The network controller 130 may communicate with the eNBs 110 via a backhaul. The APs 110 may also communicate with one another, e.g., directly or indirectly via wireless or wireline backhaul.

The STAs 120 may be dispersed throughout the wireless network 100, and each STA may be stationary or mobile. A STA may also be referred to as a terminal, a mobile station, a subscriber unit, a station, etc. A STA may be a cellular phone, a personal digital assistant (PDA), a wireless modem, a wireless communication device, a handheld device, a laptop computer, a cordless phone, a wireless local loop (WLL) station, or other mobile entities. A STA may be able to communicate with eNBs, APs, or other network entities. In FIG. 1, a solid line with double arrows indicates desired transmissions between a STA and a serving AP, which is an AP designated to serve the STA on the downlink and/or uplink. A dashed line with double arrows indicates interfering transmissions between from STAs or APs. AP 110a may be in communication with STAs 120b, 120c. AP 110b may be in communication with STAs 120a, 120d, 120e. AP 110c may be in communication with STA 120f, 120e. STAs and APs may receive interference from other APs and STAs. In the example of FIG. 1, STA 120a experiences interference from STAs 120c, 120f, and APs 110a, 110c. The APs may receive interference from other APs and STAs (not illustrated).

In accordance with one or more embodiments of the present disclosure, there are provided techniques for channel selection by an AP with mobile station assistance.

Smart channel selection in Wi-Fi may be based on AP measurements whether the traffic is DL (from AP to STA) or UL (from STA to AP). Moreover, smart channel may be based on the AP measuring beacons from other APs and deciding on the channel with least interference. With DL traffic, the AP may be the transmitter and the STA may be the receiver. Therefore, there may be a mismatch between the interference seen at the AP and the interference seen at the STA. An example may be when the AP and STA are far from each other. Furthermore, the dominant source of interference to the STA may be another STA rather than an AP. Methods disclosure may perform channel selection based on STA measurements.

In one embodiment, the AP may set periodic time intervals for the associated STAs to perform measurements. All STAs may perform measurements at the same time. This periodic time may be different for overlapping BSSs so that each STA may measure interference from adjacent BSSs. For example, in FIG. 1, AP 110b may determine periodic time intervals for the associated STAs 120a, 120d, 120e to perform measurements. The AP 110b may send a message or otherwise signal the STAs 120a, 120d, 120e with an indication of the periodic time intervals. At the designated time intervals, the STAs 120a, 120d, 120e perform measurements. The STAs 120a, 120d, 120e may communicate the measurements to the AP 110b. APs 110a, 110c may determine periodic time intervals and signal the periodic time intervals to the associated STAs 120b, 120c, and STAs 120f, respectively.

The periodic time may be determined by the AP to be, for example, a function of the beacon time. Overlapping BSSs may select non-overlapping beacons so that STAs may decode beacons from different BSSs to facilitate mobility. If BSSs are hidden from each other, an AP may rely on STA measurements to know beacon timing for all beacons heard by all STAs and by the AP itself. The STAs may report all beacon timings from all BSSIDs and report the timing and BSSIDs to the AP. The AP may integrate all the information to determine the timing for each BSSID and select the AP's own beacon timing. The integration of the information may be through averaging different timing measurements from different STAs for the same BSSID. The STAs may report beacon timing and measuring signal strength to the AP. Integration of information at the AP may take into account one or both the timing and signal strength of the measurements from the different STAs through giving higher weight to beacons received at higher signal strength because it indicates a nearby and potentially higher interfering BSS.

In one aspect, the APs may rely on STA assistance to determine the periodic time intervals. For example, it may be desirable for the periodic time intervals for the APs 110a, 110b, 110c to be different because the APs 110a, 110b, 110c are overlapping APs. The STAs may listen for beacons from other BSSs and help the AP in selecting the periodic time interval. For example, AP 110b may rely on assistance from STA 120a to listen for beacons from other BSSs. STA 120a may hear the beacons from APs 110a, 110c and communicate the beacon timing to AP 110b. Based on the information received from STA 120a, AP 110b may determine the periodic time intervals.

In another embodiment, events may trigger measurements at the STAs. For example, high collision rates for one or more STAs associated with an AP may trigger measurements at the STAs. The high collision rates may be detected if the STAs experience high packet error rates while the received signal strength indication (RSSI) of the serving AP is above a threshold. STAs may determine the RSSI of the serving AP based on a number of potentially interfering nodes. The STAs may monitor the medium and infer the number of potentially interfering nodes through reading MAC IDs from packets received one the air and recording the RSSI level and duty cycle.

As another example, if the STA and AP find that the medium utilization is high on a given channel due to the presence of many nodes within the CSMA coverage, the presence of the many nodes may trigger measurements. Measuring medium utilization may be a function of clear channel assessment (CCA) counters. For example, wherever the STA or AP is listening to the medium and finds the medium busy because an energy level is above a threshold, or the STA or AP decodes IEEE 802.11 preambles and sets the network allocation vector (NAV). The STA or AP may calculate the probability that the medium is free, which may be an indication of the traffic load on the channel. The STA or AP may try to find a channel with lower medium utilization, or less loading.

As another example, high adjacent channel interference that may not be resolved with CSMA, RTS/CTS may trigger measurements. If there are more APs that belong to the same operator/network on one channel and using specific self organized networks (SON) algorithms, the AP may prefer to move to this channel since it may perform better even if the current channel has fewer overlapping BSSs from different operators/networks.

For overlapping BSSs and since the interference may be mutual, there may be some correlations in the event triggers. For example, when one STA experiences high collision rates, another STA from a different BSS may also experience high collision rates such that high collision rates at two STAs are correlated. In the example of FIG. 1, STAs 120a, 120c may interfere with each other such that the STAs 120a, 120c detect the same collision rates. STA 120a may experience high collision rates and initiate measurements. At the same or substantially same time, STA 120c may detect high collision rates and initiate measurements. Because both STAs 120a, 120c may be taking measurements rather than transmitting data, the STAs 120a, 120c may not measure the correct interference. This may repeat without the STAs measuring the correct interference because the STAs 120a, 120c both detect high collision rates and enter the measurement phase.

Some randomization may be needed to indicate a start of a measurement period to address the issue of correlated event triggers. For example a randomization signal may indicate the start of the measurement period once the event trigger occurs. The randomization function may provide a time offset. After the occurrence of an event trigger, the STA may wait for a period of time based on the time offset before starting measurements. Two STAs experiencing correlated event triggers may begin measurements at different times because the randomization provides each STA with a different time offset. For example, a first STA is given a first time offset and a second STA is given a second time offset. After the occurrence of a trigger, the first STA waits for a period of time, e.g., equal to the first time offset and begins measurements. After the occurrence of the trigger, the second STA waits for a period of time, e.g., equal to the second time offset and begins measurements. Because the first and second time offsets are random, they may be different. Therefore, the two STAs may take measurements at different times. The randomization may be based on a function determined by a random seed. For example, the random seed may be based on a beacon time which is chosen to be orthogonal from other overlapping BSSs. In the example of FIG. 1, STA 120a may have a randomized start time based on the beacon time of AP 110c. STA 120c may have a randomized start time based on the beacon time of AP 110a. STAs 120a, 120c may interfere with each other such that the STAs 120a, detect the same collision rates. In this case, because the measurement start times are based on randomized times, the STAs 120a, 120c may not begin measurements at the same or substantially same time. For example, STA 120a may have an earlier measurement start time. STA 120a may enter the measurement period and detect an interference level. STA 120a may then resume communication with 110b. STA 120c may begin measurement after STA 120a has completed the measurement period due to the randomization of the measurement times.

In one embodiment STAs may estimate the interference on different channels and feedback the information to the AP. Interference estimation may be performed with or without clear-to-send-2-self (CTS2S). The CTS2S message may be sent by an IEEE 802.11 device to silence neighbor STAs for a period of time specified in the CTS2S message. Interference estimation without CTS2S may give an estimate on baseline interference seen if ready-to-send/clear-to-send (RTS/CTS) is not used. Interference estimation with CTS2S may give an estimate of residual interference seen even if RTS/CTS is used. Interference measurements with and without CTS2S may be used by the AP to decide whether or not to use RTS/CTS, in addition or in alternative to channel selection. Using CTS2S may introduce some overhead to the network. It may be desirable to minimize the use of CTS2S for such measurements. In one aspect, all STAs in the BSS may send CTS2S simultaneously but this may result in an underestimate in the interference value. In another aspect, the AP may send the CTS2S on behalf of the STAs or one of the STAs may be selected by the AP to perform this. For example, the AP may select the STA that suffers the highest packet error rate (PER) or the lowest throughput to perform CTS2S. The STAs may take turns in sending the CTS2S in different measurement periods.

Interference estimate may include interference levels and duty cycle. Interference may account for total interference including adjacent channel interference.

In another embodiment, the STA may detect the different MAC IDs and BSSIDs on each channel with interference duty cycles and interference levels above some threshold. This may provide an indication of spatial reuse loss (or loading) on these channels. Received signal strength indication (RSSI) may be used to measure the interference level. RSSI of the serving AP may be included in the measurements. Interference levels, burst lengths, duty cycle, serving RSSIs and different number of nodes detected may be fused into one metric that may quantify the link quality. Depending on receiver implementation, burst length may or may not be less important because even a small bust may cause the same effect as a long burst. Interference that results in channel reuse may be taken into account as a resource hit (TDM hit in the pre-log factor of the channel capacity). Interference that results in signal to interference plus noise ratio (SINR) hit may be reflected based on some channel quality indicator (CQI) calculation based on data that depends on the STA receiver implementation. For example, the CQI may be based on a lookup table, database, etc. that depends on the STA receiver implementation.

The AP may collect the interference measurements from all serving STAs and determine one or more channels to use to serve the associated STAs. The AP may select a channel with a highest capacity. For example, the capacity may be based on interference levels and number of APs/STAs within CSMA range. The AP may determine whether to use channel bonding and how many channels to bond together. The AP may determine whether it the different bands may be divided to service the associated STAs in two or more different bands.

If different STAs experience different interference background on different channels, then the AP may determine to serve each subset of STAs on different channels and TDM across these channels if the radio frequency front end (RFFE) does not support using multiple channels. Moreover, if the AP tunes from channel A (CH A) to channel B (CH B), the AP may send CTS2S to the STAs on CH A in order to prevent these STAs from sending UL data while the AP is tuned away. For STAs with mixed DL/UL traffic the AP may make a determination on channel selection based on a joint metric or UL and DL channel quality, for example, by taking AP measurements into account.

Figure 2:
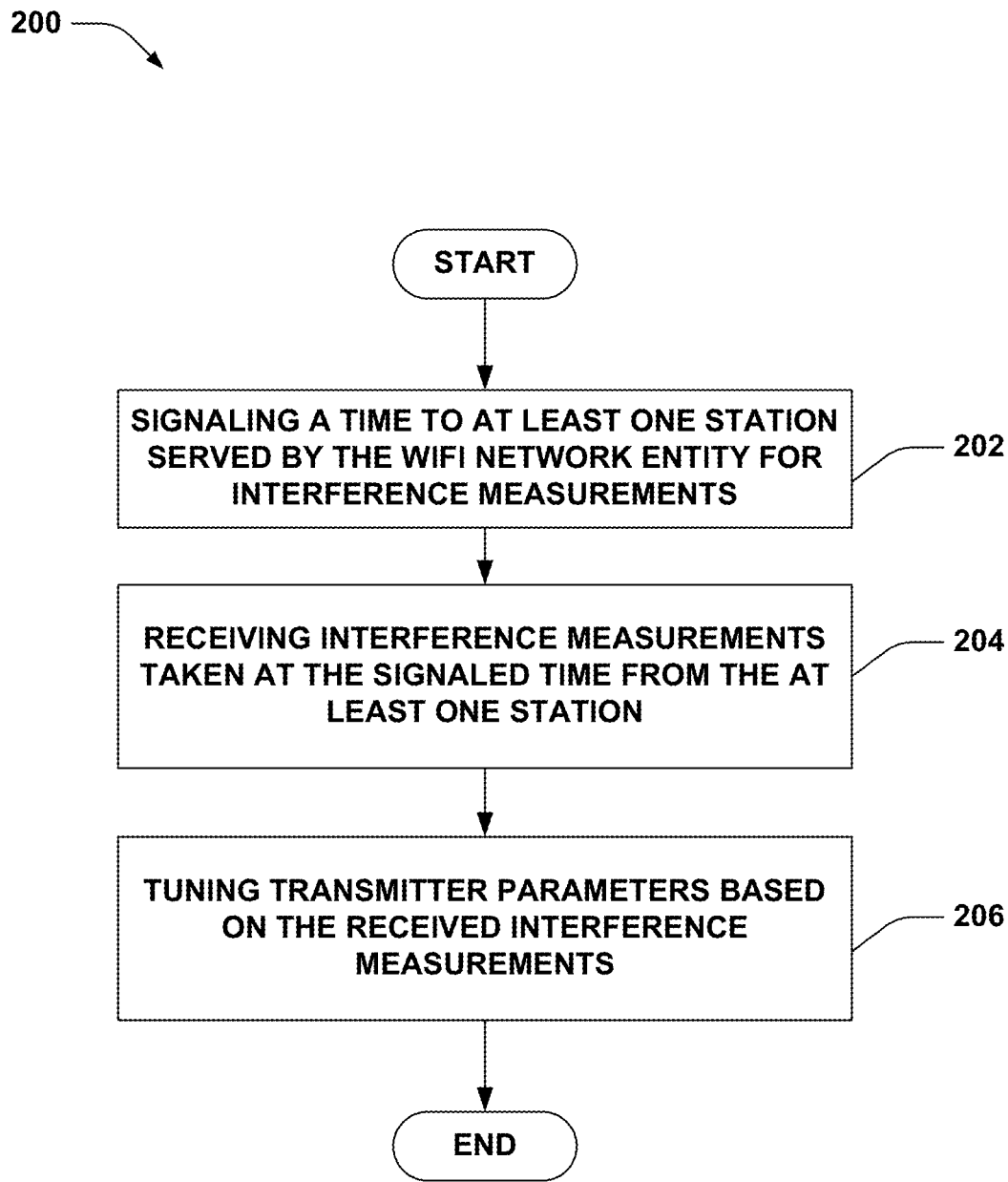
FIGS. 2-5 illustrate aspects of methodologies for station assisted channel selection.

In accordance with one or more aspects of the embodiments described herein, with reference to FIG. 2, there is shown a methodology 200, operable by a network entity, such as, for example, a Wi-Fi AP, base station, or the like. Specifically, method 200 describes station assisted channel selection. The method 200 may involve, at 202, signaling a time to at least one station served by the Wi-Fi network entity for interference measurements. The method 200 may involve, at 204, receiving interference measurements taken at the signaled time from the at least one station. Further, the method may involve, at 206, selecting at least one channel to communicate with the at least one station based on the received interference measurements.

Figure 4:
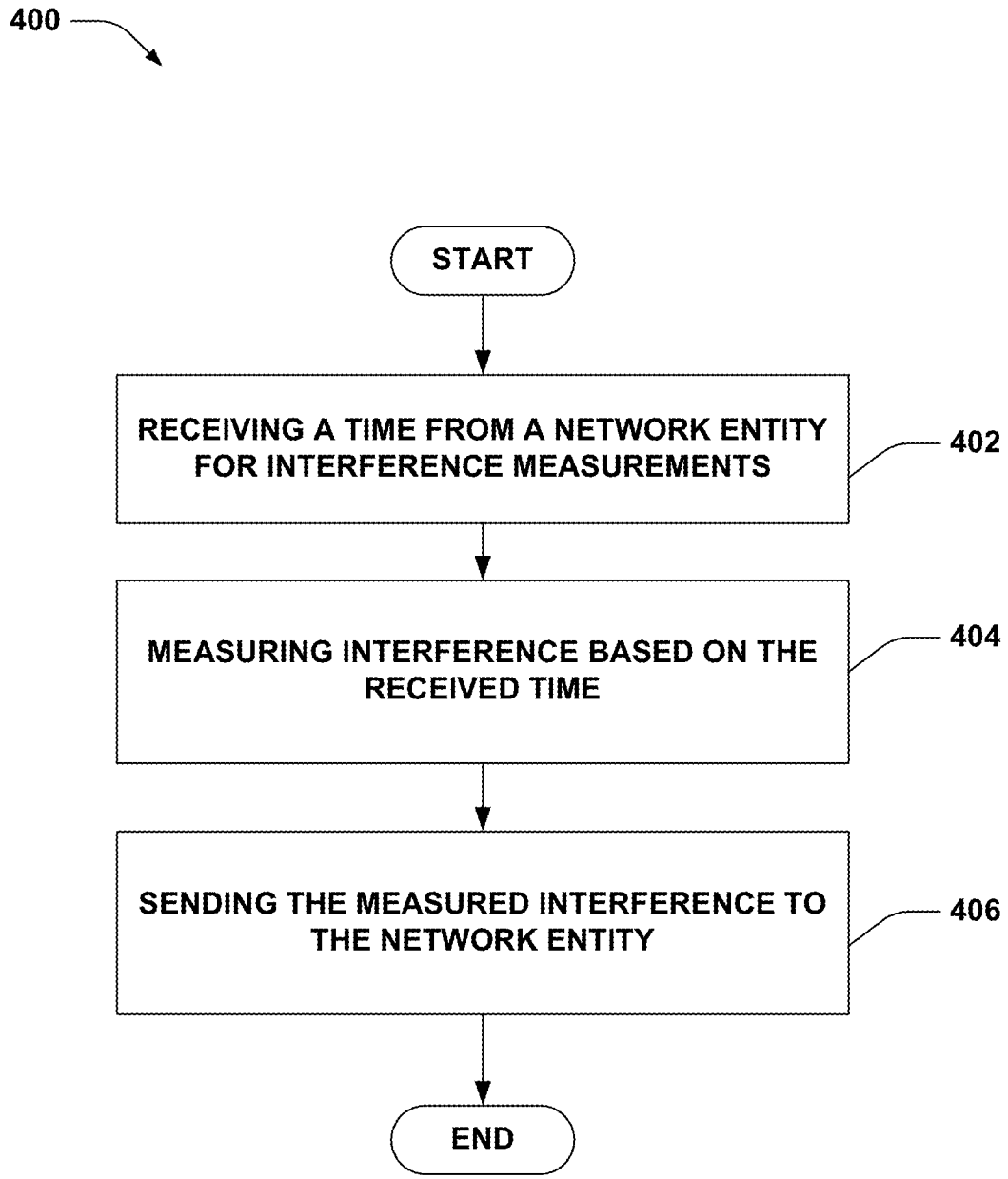

In accordance with one or more aspects of the embodiments described herein, with reference to FIG. 4, there is shown a methodology 400, operable by an STA, such as, for example, a user equipment, mobile station, or the like. Specifically, method 400 describes station assisted channel selection. The method 400 may involve, at 402, signaling at least one trigger indication to at least one station served by the Wi-Fi network entity for interference measurements. The method 400 may involve, at 404, receiving interference measurements taken based on the at least one trigger indication from the at least one station. Further, the method may involve, at 406, selecting at least one channel to communicate with the at least one station based on the received interference measurements.

In accordance with one or more aspects of the embodiments described herein, with reference to FIG. 4, there is shown a methodology 400, operable by a terminal, such as, for example, a Wi-Fi station, or the like. Specifically, method 400 describes station assisted channel selection. The method 400 may involve, at 402, receiving a time from a network entity for interference measurements. The method 400 may involve, at 404, measuring interference based on the received time. Further, the method may involve, at 406, sending the measured interference to the network entity.

Figure 5:
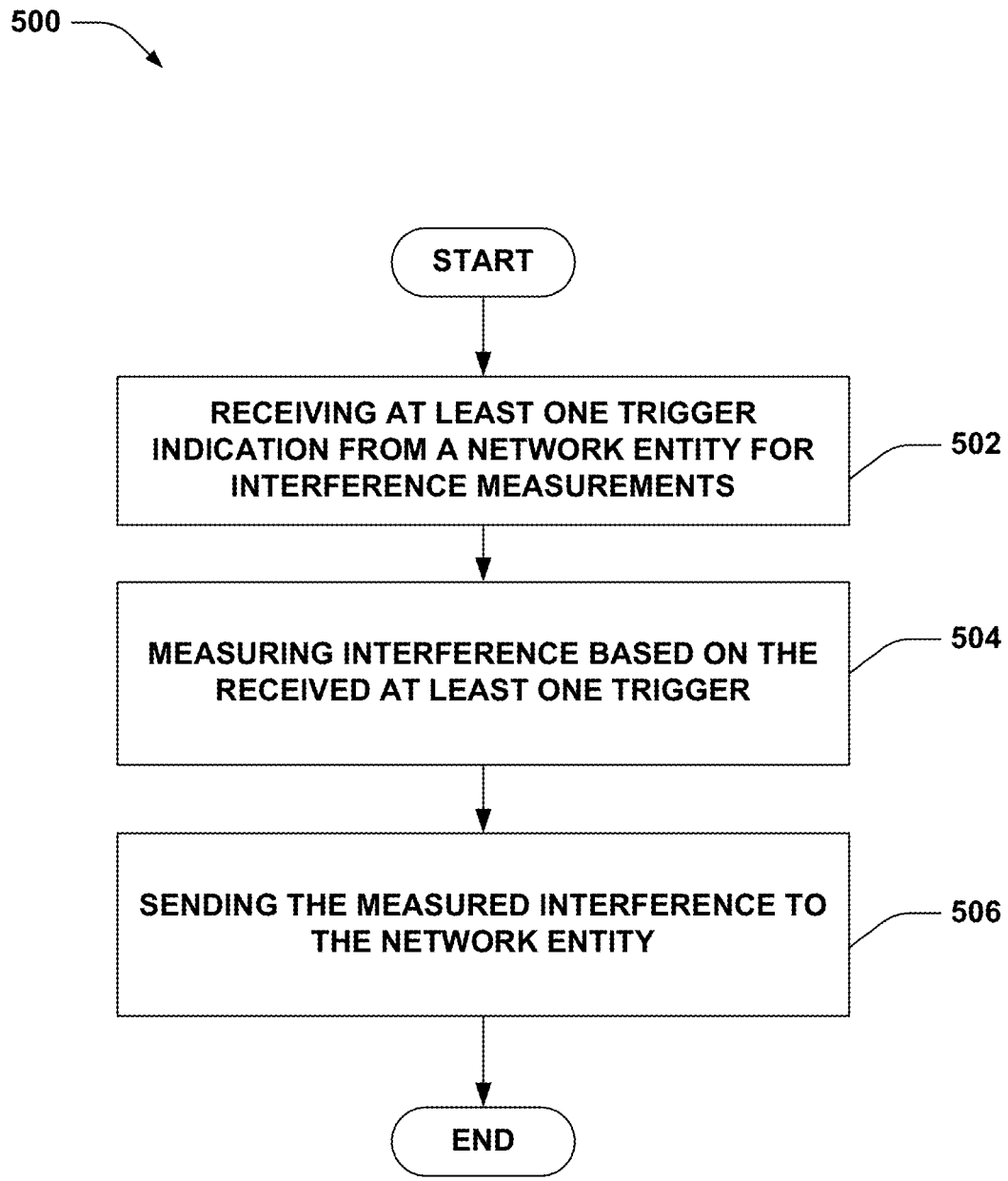

In accordance with one or more aspects of the embodiments described herein, with reference to FIG. 5, there is shown a methodology 500, operable by a terminal, such as, for example, a Wi-Fi station, or the like. Specifically, method 500 describes station assisted channel selection. The method 500 may involve, at 502, receiving at least one trigger indication from a network entity for interference measurements. The method 500 may involve, at 504, measuring interference based on the received at least one trigger. Further, the method may involve, at 506, sending the measured interference to the network entity.

Figure 6:
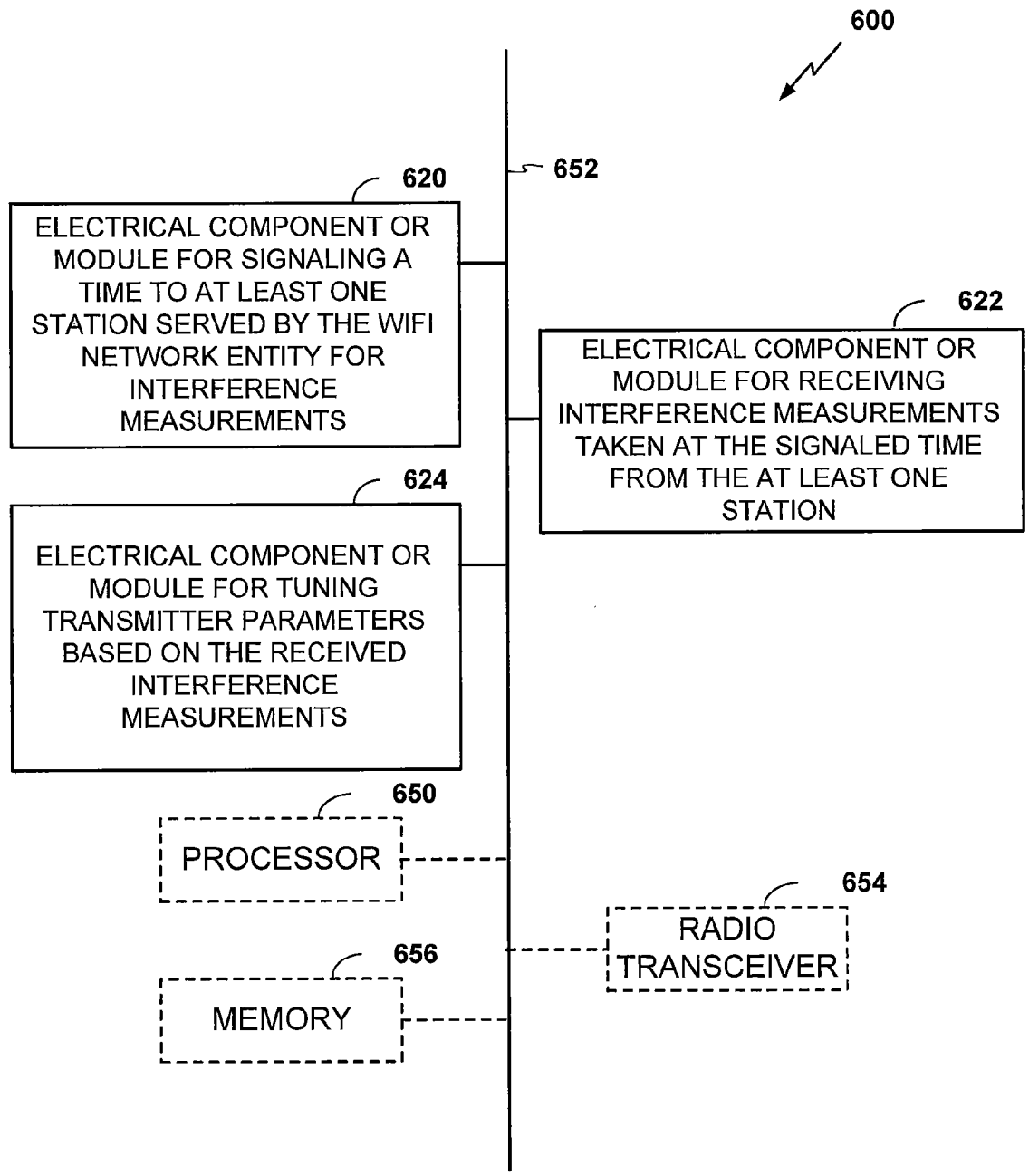
FIGS. 6-9 show embodiments of apparatuses for station assisted channel selection, in accordance with the methodologies of FIGS. 2-5.

FIG. 6 shows an embodiment of an apparatus for station assisted channel selection, in accordance with the methodology of FIG. 2. With reference to FIG. 6, there is provided an exemplary apparatus 600 that may be configured as a network entity (e.g., a Wi-Fi AP or the like) in a wireless network, or as a processor or similar device/component for use within the network entity. The apparatus 600 may include functional blocks that can represent functions implemented by a processor, software, or combination thereof (e.g., firmware). For example, apparatus 600 may include an electrical component or module 620 for signaling a time to at least one station served by the Wi-Fi network entity for interference measurements. The apparatus 600 may include an electrical component or module 622 for receiving interference measurements taken at the signaled time from the at least one station. The apparatus 600 may include an electrical component or module 624 for selecting at least one channel to communicate with the at least one station based on the received interference measurements.

In related aspects, the apparatus 600 may optionally include a processor component 650 having at least one processor, in the case of the apparatus 600 configured as a network entity (e.g., an AP or the like), rather than as a processor. The processor 650, in such case, may be in operative communication with the components 620-624 via a bus 652 or similar communication coupling. The processor 650 may effect initiation and scheduling of the processes or functions performed by electrical components 620-624.

In further related aspects, the apparatus 600 may include a radio transceiver component 654. A stand alone receiver and/or stand alone transmitter may be used in lieu of or in conjunction with the transceiver 654. When the apparatus 600 is a network entity, the apparatus 600 may also include a network interface (not shown) for connecting to one or more core network entities. The apparatus 600 may optionally include a component for storing information, such as, for example, a memory device/component 656. The computer readable medium or the memory component 656 may be operatively coupled to the other components of the apparatus 600 via the bus 652 or the like. The memory component 656 may be adapted to store computer readable instructions and data for effecting the processes and behavior of the components 620-624, and subcomponents thereof, or the processor 650, or the methods disclosed herein. The memory component 656 may retain instructions for executing functions associated with the components 620-624. While shown as being external to the memory 656, it is to be understood that the components 620-624 can exist within the memory 656. It is further noted that the components in FIG. 6 may comprise processors, electronic devices, hardware devices, electronic sub-components, logical circuits, memories, software codes, firmware codes, etc., or any combination thereof.

Figure 3:
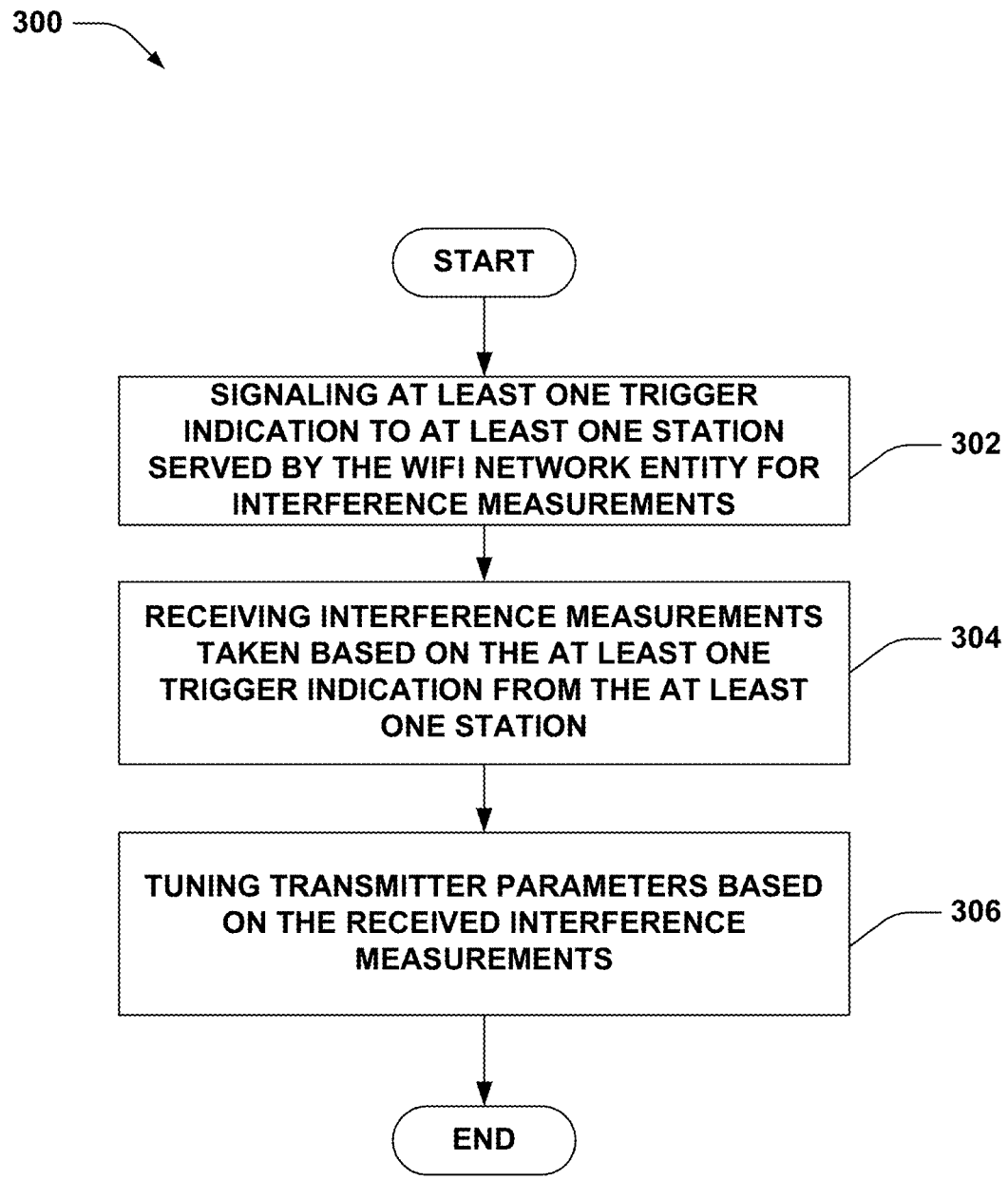
Figure 7:
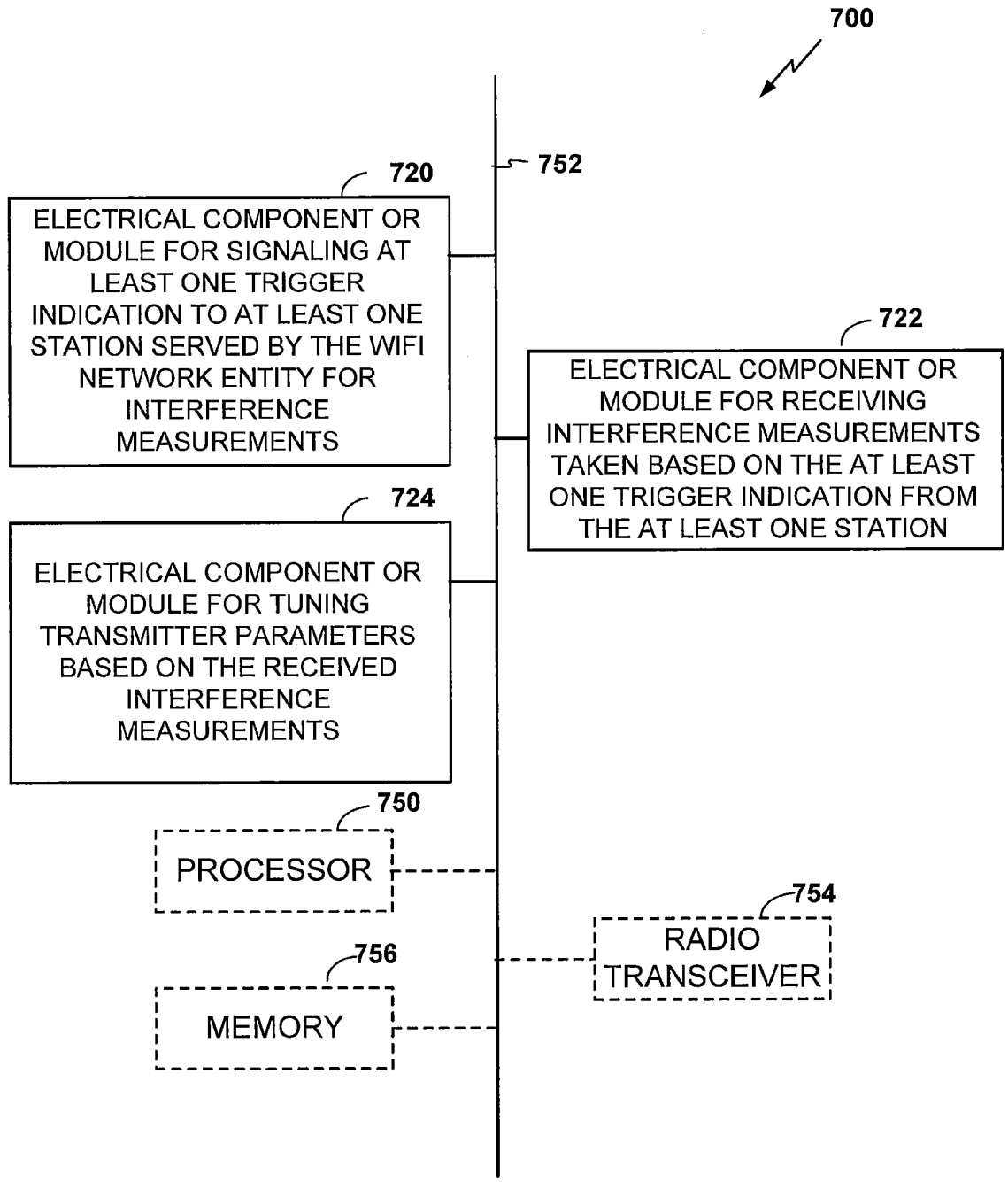

FIG. 7 shows an embodiment of an apparatus for station assisted channel selection, in accordance with the methodology of FIG. 3. With reference to FIG. 7, there is provided an exemplary apparatus 700 that may be configured as a network entity (e.g., a Wi-Fi AP or the like) in a wireless network, or as a processor or similar device/component for use within the network entity. The apparatus 700 may include functional blocks that can represent functions implemented by a processor, software, or combination thereof (e.g., firmware). For example, apparatus 700 may include an electrical component or module 720 for signaling at least one trigger indication to at least one station served by the Wi-Fi network entity for interference measurements. The apparatus 700 may include an electrical component or module 722 for receiving interference measurements taken based on the at least one trigger indication from the at least one station. The apparatus 700 may include an electrical component or module 724 for selecting at least one channel to communicate with the at least one station based on the received interference measurements.

In related aspects, the apparatus 700 may optionally include a processor component 750 having at least one processor, in the case of the apparatus 700 configured as a network entity (e.g., an AP or the like), rather than as a processor. The processor 750, in such case, may be in operative communication with the components 720-724 via a bus 752 or similar communication coupling. The processor 750 may effect initiation and scheduling of the processes or functions performed by electrical components 720-724.

In further related aspects, the apparatus 700 may include a radio transceiver component 754. A stand alone receiver and/or stand alone transmitter may be used in lieu of or in conjunction with the transceiver 754. When the apparatus 700 is a network entity, the apparatus 700 may also include a network interface (not shown) for connecting to one or more core network entities. The apparatus 700 may optionally include a component for storing information, such as, for example, a memory device/component 756. The computer readable medium or the memory component 756 may be operatively coupled to the other components of the apparatus 700 via the bus 752 or the like. The memory component 756 may be adapted to store computer readable instructions and data for effecting the processes and behavior of the components 720-724, and subcomponents thereof, or the processor 750, or the methods disclosed herein. The memory component 756 may retain instructions for executing functions associated with the components 720-724. While shown as being external to the memory 756, it is to be understood that the components 720-724 can exist within the memory 756. It is further noted that the components in FIG. 7 may comprise processors, electronic devices, hardware devices, electronic sub-components, logical circuits, memories, software codes, firmware codes, etc., or any combination thereof.

Figure 8:
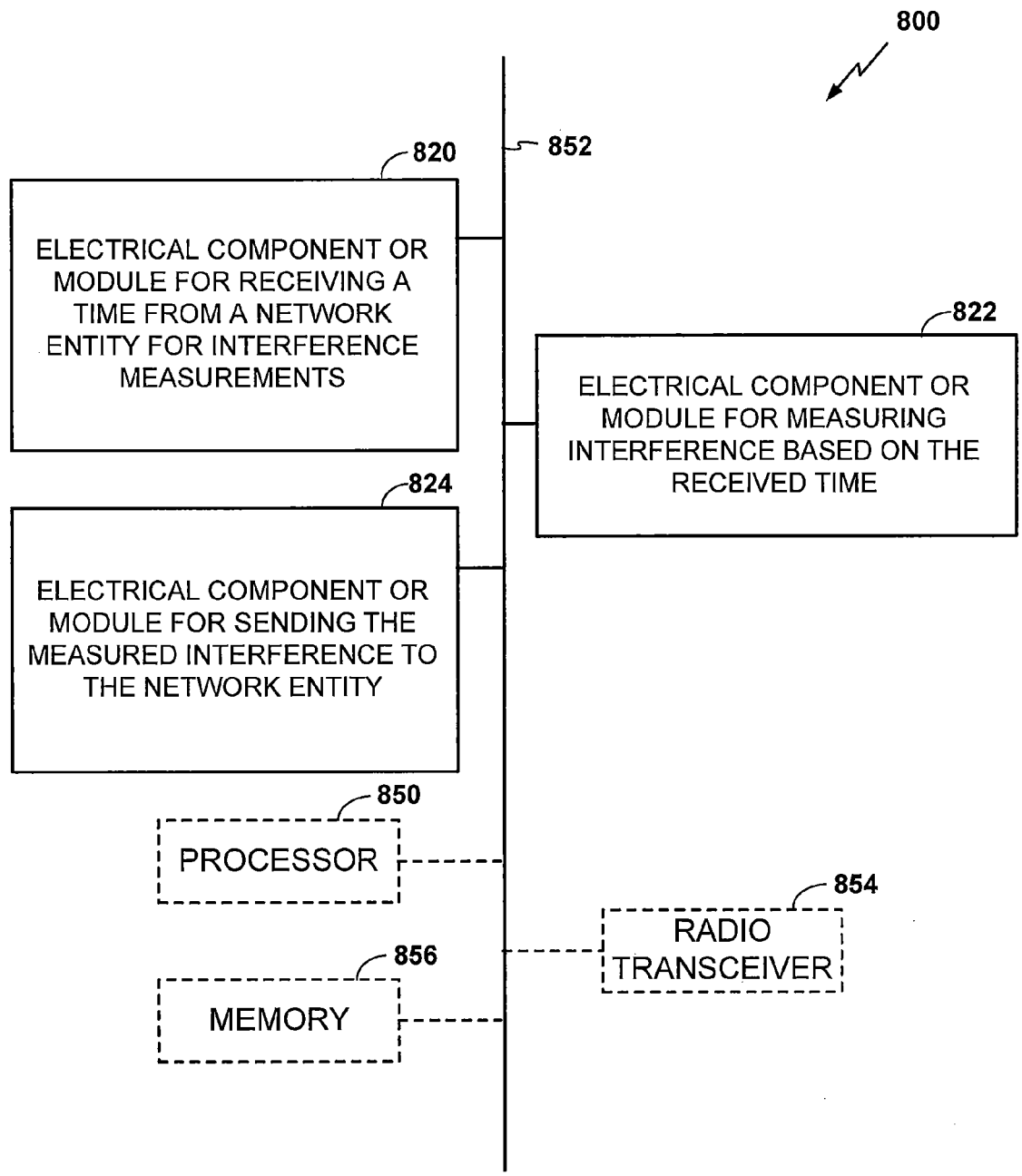

FIG. 8 shows an embodiment of an apparatus for station assisted channel selection, in accordance with the methodology of FIG. 4. With reference to FIG. 8, there is provided an exemplary apparatus 800 that may be configured as a terminal (e.g., a station or the like) in a wireless network, or as a processor or similar device/component for use within the network entity. The apparatus 800 may include functional blocks that can represent functions implemented by a processor, software, or combination thereof (e.g., firmware). For example, apparatus 800 may include an electrical component or module 820 for receiving a time from a network entity for interference measurements. The apparatus 800 may include an electrical component or module 822 for measuring interference based on the received time. The apparatus 800 may include an electrical component or module 824 for sending the measured interference to the network entity.

In related aspects, the apparatus 800 may optionally include a processor component 850 having at least one processor, in the case of the apparatus 800 configured as a network entity (e.g., an AP or the like), rather than as a processor. The processor 850, in such case, may be in operative communication with the components 820-824 via a bus 852 or similar communication coupling. The processor 850 may effect initiation and scheduling of the processes or functions performed by electrical components 820-824.

In further related aspects, the apparatus 800 may include a radio transceiver component 854. A stand alone receiver and/or stand alone transmitter may be used in lieu of or in conjunction with the transceiver 854. When the apparatus 800 is a network entity, the apparatus 800 may also include a network interface (not shown) for connecting to one or more core network entities. The apparatus 800 may optionally include a component for storing information, such as, for example, a memory device/component 856. The computer readable medium or the memory component 856 may be operatively coupled to the other components of the apparatus 800 via the bus 852 or the like. The memory component 856 may be adapted to store computer readable instructions and data for effecting the processes and behavior of the components 820-824, and subcomponents thereof, or the processor 850, or the methods disclosed herein. The memory component 856 may retain instructions for executing functions associated with the components 820-824. While shown as being external to the memory 856, it is to be understood that the components 820-824 can exist within the memory 856. It is further noted that the components in FIG. 8 may comprise processors, electronic devices, hardware devices, electronic sub-components, logical circuits, memories, software codes, firmware codes, etc., or any combination thereof.

Figure 9:
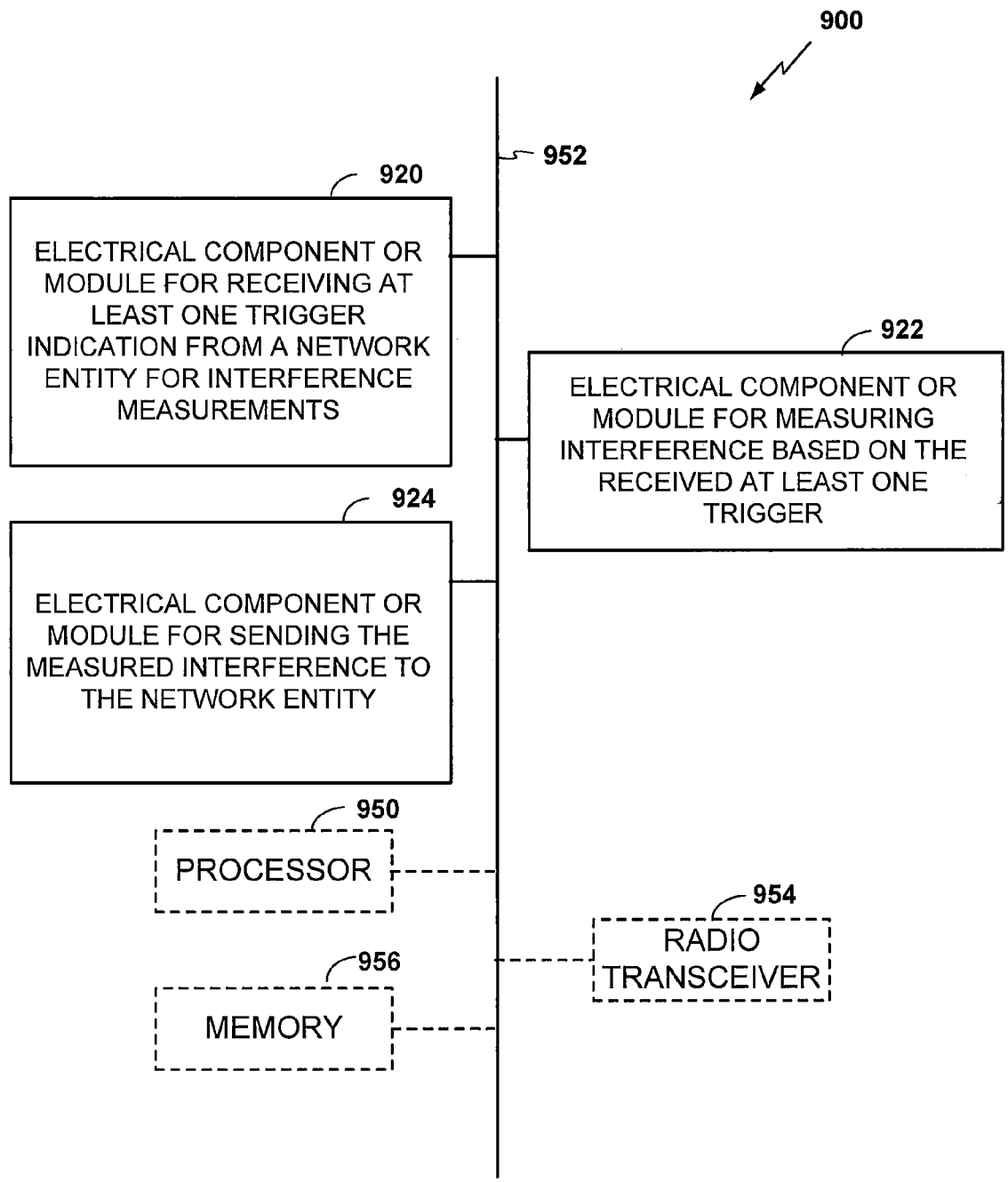

FIG. 9 shows an embodiment of an apparatus for station assisted channel selection, in accordance with the methodology of FIG. 5. With reference to FIG. 9, there is provided an exemplary apparatus 900 that may be configured as a terminal (e.g., a station or the like) in a wireless network, or as a processor or similar device/component for use within the network entity. The apparatus 900 may include functional blocks that can represent functions implemented by a processor, software, or combination thereof (e.g., firmware). For example, apparatus 900 may include an electrical component or module 920 for receiving at least one trigger indication from a network entity for interference measurements. The apparatus 900 may include an electrical component or module 922 for measuring interference based on the received at least one trigger. The apparatus 900 may include an electrical component or module 924 for sending the measured interference to the network entity.

In related aspects, the apparatus 900 may optionally include a processor component 950 having at least one processor, in the case of the apparatus 900 configured as a network entity (e.g., an AP or the like), rather than as a processor. The processor 950, in such case, may be in operative communication with the components 920-924 via a bus 952 or similar communication coupling. The processor 950 may effect initiation and scheduling of the processes or functions performed by electrical components 920-924.

In further related aspects, the apparatus 900 may include a radio transceiver component 954. A stand alone receiver and/or stand alone transmitter may be used in lieu of or in conjunction with the transceiver 954. When the apparatus 900 is a network entity, the apparatus 900 may also include a network interface (not shown) for connecting to one or more core network entities. The apparatus 900 may optionally include a component for storing information, such as, for example, a memory device/component 956. The computer readable medium or the memory component 956 may be operatively coupled to the other components of the apparatus 900 via the bus 952 or the like. The memory component 956 may be adapted to store computer readable instructions and data for effecting the processes and behavior of the components 920-924, and subcomponents thereof, or the processor 950, or the methods disclosed herein. The memory component 956 may retain instructions for executing functions associated with the components 920-924. While shown as being external to the memory 956, it is to be understood that the components 920-924 can exist within the memory 956. It is further noted that the components in FIG. 9 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a Wi-Fi network entity, the method comprising:
   signaling a time to at least one station served by the Wi-Fi network entity for interference measurements;
   receiving interference measurements taken at the signaled time from the at least one station, the interference measurements including a first interference value measured without transmitting a clear-to-send-2-self (CTS2S) message and a second interference value measured after transmitting the CTS2S message;
   based on the received interference measurements, selecting at least one channel to serve the at least one station, as a first transmitter parameter; and
   based on the received interference measurements, using ready-to-send/clear-to-send (RTS/CTS), as a second transmitter parameter.

2. The method of claim 1, further comprising at least one of:
   selecting a channel rate control loop setting, as a third transmitter parameter; or
   selecting a transmit power to communicate with the at least one station, as a fourth transmitter parameter; or
   a combination thereof.

3. The method of claim 1, wherein the time comprises periodic time intervals.

4. The method of claim 3, wherein the periodic time intervals are selected to be non-overlapping for overlapping network entities.

5. The method of claim 4, further comprising receiving beacon information associated with other network entities from the at least one station, wherein at least one of the time or a beacon time of the Wi-Fi network entity is based on the received beacon information.

6. The method of claim 5, wherein the beacon information comprises at least one of an SSID, beacon timing information, or received signal strength information.

7. The method of claim 1, further comprising communicating with the at least one station on the selected at least one channel.

8. The method of claim 1, wherein the selecting at least one channel comprises selecting at least two channels, and the method further comprising bonding the at least two channels for communication with the at least one station.

9. The method of claim 1, wherein the selecting at least one channel comprises selecting at least two channels, and the method further comprising communicating with a first station on a first of the at least two channels, and communicating with a second station on a second of the at least two channels.

10. The method of claim 1, wherein the selecting at least one channel comprises selecting at least two channels, and the method further comprising communicating with the at least one station based on TDM across the at least two channels.

11. The method of claim 1, further comprising sending a clear-to-send-2-self (CTS2S) to the at least one station during a tuning operation from a first channel to a second channel.

12. The method of claim 1, wherein the selecting at least one channel comprises selecting based on a joint metric, or UL and DL channel quality, or a combination thereof.

13. The method of claim 1, wherein the signaled time is determined based on non-overlapping beacon times.

14. A Wi-Fi apparatus comprising:
at least one processor configured to:
signal a time to at least one station served by the Wi-Fi apparatus for interference measurements,
receive interference measurements taken at the signaled time from the at least one station, the interference measurements including a first interference value measured without transmitting a clear-to-send-2-self (CTS2S) message and a second interference value measured after transmitting the CTS2S message,
based on the received interference measurements, select at least one channel to serve the at least one station, as a first transmitter parameter, and based on the received interference measurements, use ready-to-send/clear-to-send (RTS/CTS), as a second transmitter parameter; and
a memory coupled to the at least one processor for storing data.

15. The Wi-Fi apparatus of claim 14, wherein the at least one processor is further configured to at least one of:
select a channel rate control loop setting, as a third transmitter parameter, or
select a transmit power to communicate with the at least one station, as a fourth transmitter parameter, or
a combination thereof.

16. The Wi-Fi apparatus of claim 14, wherein the time comprises periodic time intervals.

17. The Wi-Fi apparatus of claim 16, wherein the periodic time intervals are selected to be non-overlapping for overlapping network entities.

18. The Wi-Fi apparatus of claim 14, wherein the to select at least one channel comprises to select at least two channels, and the at least one processor is further configured to bond the at least two channels for communication with the at least one station.

19. The Wi-Fi apparatus of claim 14, wherein the to select at least one channel comprises to select at least two channels, and the at least one processor is further configured to communicate with a first station on a first of the at least two channels, and communicate with a second station on a second of the at least two channels.

20. The Wi-Fi apparatus of claim 14, wherein the to select at least one channel comprises to select at least two channels, and the at least one processor is further configured to communicate with the at least one station based on TDM across the at least two channels.

21. The Wi-Fi apparatus of claim 14, wherein the at least one processor is further configured to send a clear-to-send-2-self (CTS2S) to the at least one station during a tuning operation from a first channel to a second channel.

22. The Wi-Fi apparatus of claim 14, wherein to select at least one channel comprises to select based on a joint metric, or UL and DL channel quality, or a combination thereof.

23. A Wi-Fi apparatus comprising non-transitory computer program means for:
signaling a time to at least one station served by the Wi-Fi network entity for interference measurements;
receiving interference measurements taken at the signaled time from the at least one station, the interference measurements including a first interference value measured without transmitting a clear-to-send-2-self (CTS2S) message and a second interference value measured after transmitting the CTS2S message;
based on the received interference measurements, selecting at least one channel to serve the at least one station, as a first transmitter parameter; and
based on the received interference measurements, using ready-to-send/clear-to-send (RTS/CTS), as a second transmitter parameter.

24. The Wi-Fi apparatus of claim 23, wherein the non-transitory computer program means further comprises at least one of:
selecting a channel rate control loop setting, as a third transmitter parameter; or
selecting a transmit power to communicate with the at least one station, as a fourth transmitter parameter; or
a combination thereof.

25. The Wi-Fi apparatus of claim 23, wherein the time comprises periodic time intervals.

26. The Wi-Fi apparatus of claim 25, wherein the periodic time intervals are selected to be non-overlapping for overlapping network entities.

27. The Wi-Fi apparatus of claim 23, wherein the non-transitory computer program means for selecting at least one channel comprises non-transitory computer program means for selecting at least two channels, and the apparatus further comprises computer program means for bonding the at least two channels for communication with the at least one station.

28. The Wi-Fi apparatus of claim 23, wherein the non-transitory computer program means for selecting at least one channel comprises non-transitory computer program means for selecting at least two channels, and the apparatus further comprises non-transitory computer program means for communicating with a first station on a first of the at least two channels, and communicating with a second station on a second of the at least two channels.

29. The Wi-Fi apparatus of claim 23, wherein the non-transitory computer program means for selecting at least one channel comprises non-transitory computer program means for selecting at least two channels, and the apparatus further comprises non-transitory computer program means for communicating with the at least one station based on TDM across the at least two channels.

30. The Wi-Fi apparatus of claim 23, further comprising non-transitory computer program means for sending a clear-to-send-2-self (CTS2S) to the at least one station during a tuning operation from a first channel to a second channel.

31. The Wi-Fi apparatus of claim 23, wherein the non-transitory computer program means for selecting at least one channel comprises computer program means for selecting based on a joint metric, or UL and DL channel quality, or a combination thereof.

32. A non-transitory computer readable medium comprising stored codes for causing at least one computer to:
signal a time to at least one station served by the Wi-Fi network entity for interference measurements;
receive interference measurements taken at the signaled time from the at least one station, the interference measurements including a first interference value measured without transmitting a clear-to-send-2-self (CTS2S) message and a second interference value measured after transmitting the CTS2S message;

based on the received interference measurements, select at least one channel to serve the at least one station, as a first transmitter parameter; and based on the received interference measurements, use ready-to-send/clear-to-send (RTS/CTS), as a second transmitter parameter.

33. The non-transitory computer readable medium of claim 32, further comprising at least one of code for causing at least one computer to:

select a channel rate control loop setting, as a third transmitter parameter; or select a transmit power to communicate with the at least one station, as a fourth transmitter parameter; or a combination thereof.

34. The non-transitory computer readable medium of claim 32, wherein the time comprises periodic time intervals.

35. The non-transitory computer readable medium of claim 34, wherein the periodic time intervals are selected to be non-overlapping for overlapping network entities.

36. A method operable by a Wi-Fi station, the method comprising:

receiving a time from a network entity for interference measurements;

taking interference measurements based on the received time by measuring a first interference value without transmitting a clear-to-send-2-self (CTS2S) and measuring a second interference value after transmitting the CTS2S; and sending the measured first and second interference values to the network entity to enable the network entity to, based on the measured interference, select at least one channel to serve the Wi-Fi station, as a first transmitter parameter, and based on the measured interference, use ready-to-send/clear-to-send (RTS/CTS), as a second transmitter parameter.

37. The method of claim 36, wherein measuring interference comprises measuring interference on different channels.

38. The method of claim 37, wherein measuring interference comprises detecting MAC IDs and BSSIDs on each of the different channels with interference duty cycle and interference level above a threshold.

39. The method of claim 38, wherein measuring interference is based on a clear channel assessment (CCA) counter.

40. The method of claim 36, wherein the time comprises periodic time intervals.

41. The method of claim 36, further comprising transmitting beacon information associated with other network entities to the network entity, wherein the time is based on the transmitted beacon information.

42. The method of claim 36, further comprising:

receiving an indication of at least one channel selection, and communicating with the network entity on the selected at least one channel.

43. The method of claim 36, further comprising transmitting a clear-to-send-2-self (CTS2S) signal prior to measuring interference.

44. The method of claim 43, wherein the CTS2S signal is transmitted with or without an RTS/CTS signal.

45. The method of claim 36, wherein sending the measured interference comprises sending the first and second interference values for the network entity to tune transmitter parameters.

46. A Wi-Fi apparatus comprising:

at least one processor configured to receive a time from a network entity for interference measurements, measure interference based on the received time and on measuring a first interference value without transmitting a clear-to-send-2-self (CTS2S) and measuring a second interference value after transmitting the CTS2S, and configured to send the measured first and second interference values to the network entity to enable the network entity to, based on the measured interference, select at least one channel to serve the Wi-Fi apparatus, as a first transmitter parameter, and based on the measured interference, use ready-to-send/clear-to-send (RTS/CTS), as a second transmitter parameter; and a memory coupled to the at least one processor for storing data.

47. The Wi-Fi apparatus of claim 46, wherein to measure interference comprises to measure interference on different channels.

48. The Wi-Fi apparatus of claim 47, wherein to measure interference comprises to detect MAC IDs and BSSIDs on each of the different channels with interference duty cycle and interference level above a threshold.

49. The Wi-Fi apparatus of claim 48, wherein to measure interference is based on a clear channel assessment (CCA) counter.

50. The Wi-Fi apparatus of claim 46, wherein the time comprises periodic time intervals.

51. The Wi-Fi apparatus of claim 46, wherein the at least one processor is further configured to transmit beacon information associated with other network entities to the network entity, wherein the time is based on the transmitted beacon information.

52. The Wi-Fi apparatus of claim 46, wherein the at least one processor is further configured to:

receive an indication of at least one channel selection, and communicate with the network entity on the selected at least one channel.

53. The Wi-Fi apparatus of claim 46, wherein the at least one processor is further configured to transmit a clear-to-send-2-self (CTS2S) signal prior to measuring interference.

54. A Wi-Fi apparatus comprising non-transitory computer program means for:

receiving a time from a network entity for interference measurements;

measuring interference based on the received time by measuring a first interference value without transmitting a clear-to-send-2-self (CTS2S) and measuring a second interference value after transmitting the CTS2S; and sending the measured first and second interference values to the network entity to enable the network entity to, based on the measured interference, select at least one channel to serve the Wi-Fi apparatus, as a first transmitter parameter, and based on the measured interference, use ready-to-send/clear-to-send (RTS/CTS), as a second transmitter parameter.

55. The Wi-Fi apparatus of claim 54, wherein the non-transitory computer program means for measuring interference comprises non-transitory computer program means for measuring interference on different channels.

56. The Wi-Fi apparatus of claim 55, wherein the non-transitory computer program means for measuring interference comprises non-transitory computer program means for detecting MAC IDs and BSSIDs on each of the different channels with interference duty cycle and interference level above a threshold.

57. The Wi-Fi apparatus of claim 56, wherein the non-transitory computer program means for measuring interference is based on a clear channel assessment (CCA) counter.

58. The Wi-Fi apparatus of claim 54, wherein the time comprises periodic time intervals.

59. The Wi-Fi apparatus of claim 54, further comprising non-transitory computer program means for transmitting beacon information associated with other network entities to the network entity, wherein the time is based on the transmitted beacon information.

60. The Wi-Fi apparatus of claim 54, further comprising: non-transitory computer program means for:
- receiving an indication of at least one channel selection, and
- communicating with the network entity on the selected at least one channel.

61. The Wi-Fi apparatus of claim 54, further comprising non-transitory computer program means for transmitting a clear-to-send-2-self (CTS2S) signal prior to measuring interference.

62. A non-transitory computer readable medium comprising stored codes for causing at least one computer to:
- receive, at a Wi-Fi station, a time from a network entity for interference measurements;
- measure interference based on the received time by measuring a first interference value without transmitting a clear-to-send-2-self (CTS2S) and measuring a second interference value after transmitting the CTS2S; and
- send the measured first and second interference values to the network entity to enable the network entity to, based on the measured interference, select at least one channel to serve the Wi-Fi station, as a first transmitter parameter, and based on the measured interference, use ready-to-send/clear-to-send (RTS/CTS), as a second transmitter parameter.

63. The non-transitory computer readable medium of claim 62, wherein codes to measure interference comprises codes to measure interference on different channels.

64. The non-transitory computer readable medium of claim 63, wherein codes to measure interference comprises codes to detect MAC IDs and BSSIDs on each of the different channels with interference duty cycle and interference level above a threshold.

65. The non-transitory computer readable medium of claim 64, wherein to measure interference is based on a clear channel assessment (CCA) counter.

66. The non-transitory computer readable medium of claim 62, wherein the time comprises periodic time intervals.

67. The non-transitory computer readable medium of claim 62, wherein the non-transitory computer readable medium further stores code for causing the at least one computer to transmit beacon information associated with other network entities to the network entity, wherein the time is based on the transmitted beacon information.

68. The non-transitory computer readable medium of claim 62, wherein the non-transitory computer readable medium further stores code for causing the at least one computer to:
- receive an indication of at least one channel selection, and
- communicate with the network entity on the selected at least one channel.

69. The non-transitory computer readable medium of claim 62, wherein the non-transitory computer readable medium further stores code for causing the at least one computer to transmit a clear-to-send-2-self (CTS2S) signal prior to measuring interference.

* * * * *